United States Patent [19]

Adams et al.

[11] 4,255,302
[45] Mar. 10, 1981

[54] RESIN SYSTEM FOR FILAMENT WINDING OF PRESSURE VESSELS

[75] Inventors: Leo G. Adams, Midvale; Richard E. Hoffman, Sandy, both of Utah

[73] Assignee: The United States of America as represented by the Secretary of the Navy, Washington, D.C.

[21] Appl. No.: 95,126

[22] Filed: Nov. 15, 1979

[51] Int. Cl.³ .................... C08L 63/02; C08L 63/00; C08L 69/48; C08L 77/10
[52] U.S. Cl. .............................. 260/18 EP; 525/422; 525/524
[58] Field of Search ............................. 525/524, 423; 260/18 EP

[56] References Cited

U.S. PATENT DOCUMENTS

| | | | |
|---|---|---|---|
| 3,657,380 | 4/1972 | Fang | 525/423 |
| 4,077,927 | 3/1978 | McPherson | 525/524 |
| 4,115,599 | 9/1978 | Taylor | 525/524 |
| 4,117,361 | 9/1978 | Smith | 525/524 |

FOREIGN PATENT DOCUMENTS 2411256  6/1979  France ........................................ 525/423

OTHER PUBLICATIONS

Chiao, T. T., Epoxy System For Filament Winding, Chemical Abstracts, vol. 82, 86,923F, (1975).
Chiao, T. T., Filament Wound Kevlar 49/Epoxy Pressure Vessels, Chemical Abstracts, 82:100,642x, (1975).
Chiao, T. T., Performance of Filament Wound Vessels From and Organic Fiber in Several Epoxy Matrixes, Chemical Abstracts 84: 74979g (1976).
Chiao, T. T., Screening of Epoxy Systems for High Performance Filament Winding Applications, Chemical Abstracts, 84: 74,932m, (1976).
Chiao, T. T., High Performance Vessels From an Aromatic Polyamide Fiber/Epoxy Composite, Chemical Abstracts, 85: 109,593b, (1976).

Primary Examiner—Paul Lieberman
Attorney, Agent, or Firm—R. S. Sciascia; Charles D. B. Curry

[57] ABSTRACT

An epoxy resin system for use in the wet winding of high strength filament wound pressure vessels with aramide fiber. The resin system is composed of a mixture of a plurality of distinct epoxy resins and aromatic curing agents. The epoxy resins were selected to impart particular properties required for the filament winding process and to improve the strength of filament wound pressure vessels. Aromatic amine curing agents were selected to alter the time/temperature gel and cure conditions of the system without significantly altering the final strength of the pressure vessels. The resin system is nominally composed of a mixture of a commercially available epoxy resins comprising diglycidyl ether of bisphenol A, a diglycidyl ester of linoleic dimer acid, and a diglycidyl ether of butanediol and the aromatic amine curing agent comprises a mixture of methylenedianiline and metaphenylenediamine in a 60/40 ratio by weight. The ratios of the components are selected to meet the specific processing needs and the final product requirements.

4 Claims, No Drawings

RESIN SYSTEM FOR FILAMENT WINDING OF PRESSURE VESSELS

BACKGROUND OF THE INVENTION

1. Field of the Invention.

The present invention relates to a resin system and more particularly to a resin system for filament winding of pressure vessels.

Description of the Prior Art.

In building filament wound high strength pressure vessels, such as for production rocket motors, it is necessary to use a resin system including binders and curing agents that are workable during the filament winding process and then properly harden to seal and retain the filaments in place. The filament material, for example, Kevlar, preferably has low weight, high strength, high temperature resistance and inert characteristics. Several different characteristics are needed in a resin system used for the complex filament winding of large pressure vessels for rocket motors. One such characteristic is that it have a long working life. Another is that it have suitable viscosity during the working process. Still another is that it cure properly after having been fully wound. It has been found that no single epoxy has all of the required characteristics.

The present invention overcomes these problems by providing a resin system having a plurality of different epoxies and curing agents that provide improved working and strength characteristics for the manufacture of complex filament wound pressure vessels.

SUMMARY OF THE INVENTION

Briefly, the present invention comprises an epoxy resin system for use in the wet winding of high strength filament wound pressure vessels with aramide fiber. The resin system is composed of a mixture of a plurality of distinct epoxy resins and aromatic curing agents. The epoxy resins were selected to impart particular properties required for the filament winding process and to improve the strength of filament wound pressure vessels. Aromatic amine curing agents were selected to alter the time temperature gel and cure conditions of the system without significantly altering the final strength of the pressure vessels. The resin system is nominally composed of a mixture of a commercially available epoxy resins comprising diglycidyl ether of bisphenol A, a diglycidyl ester of linoleic dimer acid, and a diglycidyl ether of butanediol and the aromatic amine curing agents comprise a mixture of methylenedianiline and metaphenylenediamine in a 60/40 ratio by weight. The ratios of the components are selected to meet the specific processing needs and the final product requirements.

STATEMENT OF THE OBJECTS OF THE INVENTION

An object of the present invention is to provide an effective resin system for filament winding of vessels;

Another object of the present invention is to provide an effective resin system for use with Kevlar as the filament winding material for pressure vessels;

Another object of the present invention is the use of a resin system for Kevlar pressure vessels which is largely comprised of an aliphatic constituent such as a diglycidyl ester of linoleic acid dimer;

Still another object of the present invention is to provide a resin system comprising a plurality of epoxy resins and aromatic curing agents to provide for effective filament winding of pressure vessels;

Other objects, advantages and novel features of the invention will become apparent from the following detailed description of the invention.

DESCRIPTION OF THE PREFERRED EMBODIMENT

The present invention comprises an epoxy resin system for the wet winding of high strength filament wound pressure vessels with aramide fiber. The resin is composed of a mixture of a plurality of distinct epoxy resins and aromatic curing agents. The epoxy resins were selected to impart particular properties required for the filament winding process and to improve the strength of filament wound pressure vessels. Aromatic amine curing agents were selected to alter the time/temperature gel and cure conditions of the system without significantly altering the final strength of the pressure vessels. The resin system is nominally composed of a mixture of a commercially available epoxy resin comprising diglycidyl ether of bisphenol A, a diglycidyl ester of linoleic dimer acid, and a diglycidyl ether of butanediol and the aromatic amine curing agents comprise a mixture of methylenedianiline and metaphenylenediamine in a 60/40 ratio by weight. The ratios of the components are selected to meet the specific processing needs and the final product requirements.

The following are the components and the weight range of the components suitable for use as a resin system for the manufacture of rocket motor pressure vessels using filament winding techniques.

| | | parts by weight |
|---|---|---|
| Component A | | 100 |
| | 1. diglycidyl ether of bisphenol A - 20–30% by weight (this epoxy resin has a relatively high viscosity) | |
| | 2. diglycidyl ester of linoleic dimer acid - 80–70% by weight (this epoxy resin is relatively soft) | |
| Component B | | 10–40 |
| | diglycidyl ether of butanediol (this epoxy resin has a low viscosity but upon hardening becomes brittle and hard) | |
| Component C | | 20–40 |
| | A mixture of methylenedianiline and metaphenylenediamine in a 60/40 ratio by weight. (this is a curing agent) | |
| Filament | Kevlar 49, manufactured by DuPont Corporation under this name and made commercially available. The characteristics of this material are: denier - 4440–4640 density - 1.42–1.48 gm/cc tensile strength - 250,000 psi min. modulus - 17.5 × $10^6$ min. | |

A more complete chemical definition of the component A and B epoxies may be found in Chapter 4 and Appendices 1 and 2 of the *Handbook of Epoxy Resins*, Lee and Neville, McGraw-Hill, Copyright 1967. A more complete chemical definition of Kevlar 49 may be found in "Textile Research Journal", pp. 62–66, published January 1977.

The normal time for winding rocket motor pressure vessels may take as long as seven days. The filament winding process comprises the use of a minimum friction winding path as defined by the geometry of the pressure vessel. For purpose of manufacturing it has been found that the resin system should have about the following characteristics:

viscosity—1,200 centipoise at 25° C.

gel time—18 hours with a viscosity increase not in excess of 5,000 centipoise at 25° C.

complete gel set—24 hours at 25° C.

cure—120° C. for 4 hours meets suitable pressure vessel performance testing requirements.

EXAMPLE I

|  | parts by weight |
| --- | --- |
| Component A | 100 pbw |
| Component B | 14 pbw |
| Component C | 17 pbw |
| Filament | 500 pbw |

EXAMPLE II

|  |  |
| --- | --- |
| Component A | 100 parts by wt. |
| Component B | 25 parts by wt. |
| Component C | 30 parts by wt. |
| Filament | 500 parts by wt. |

Both examples had the following characteristics:

Viscosity—about 1,200 centipoise at 25° C.

Gel time—about 18 hours-viscosity increase no more than about 5,000 centipoise at 25° C.

Complete gel set—about 24 hours

Cure—120° C. for about 4 hours

Performance of both examples in standard pressure vessels were satisfactory.

| Composition | Pressure Vessel Testing | | | |
| --- | --- | --- | --- | --- |
| | Burst Strength (psi) | Helical Stress (Ksi) | Hoop Stress (Ksi) | PV/W |
| Prior resin system | 2807 | 344.1 | 342.8 | 1.33 |
| Example I | 2949 | 361.4 | 360.1 | 1.375 |
| Example II | 2900 (approx.) | 350 (approx.) | 350 (approx.) | 1.50 (approx.) |

What is claimed is:

1. A resin system composition for the filament winding of pressure vessels comprising the mixing of:
   (a) Component A comprising diglycidyl ether of bisphenol A about 25% by weight and diglycidyl ester of linoleic dimer acid about 75% by weight;
   (b) Component B comprising diglycidyl ether of butanediol;
   (c) Component C comprising a mixture of methylenedianiline and metaphenylenediamine in a 60/40 ratio by weight; and
   (d) wherein the parts by weight ratio of components A, B and C are about 100, 25, and 30 respectively.

2. The system of claim 1 wherein the filament winding includes:
   (a) Component D which comprises Kevlar 49 filament having a denier of about 4600 and is about 500 parts by weight.

3. A resin system composition for the filament winding of pressure vessels comprising the mixing of:
   (a) Component A comprising diglycidyl ether of bisphenol A about 25% by weight and diglycidyl ester of linoleic dimer acid about 75% by weight;
   (b) Component B comprising diglycidyl ether of butanediol;
   (c) Component C comprising a mixture of methylenedianiline and metaphenylenediamine in a 60/40 ratio by weight; and
   (d) wherein the parts by weight ratio of components A, B and C are about 100, 14 and 17.

4. The system of claim 3 wherein the filament winding includes:
   (a) Component D which comprises Kevlar 49 filament having a denier of about 4600 and is about 500 parts by weight.

* * * * *